R. E. GLEASON,
Assignor, by mesne assignments, to J. TORRENT.
Log Turner.
No. 9,617. Reissued March 22, 1881.
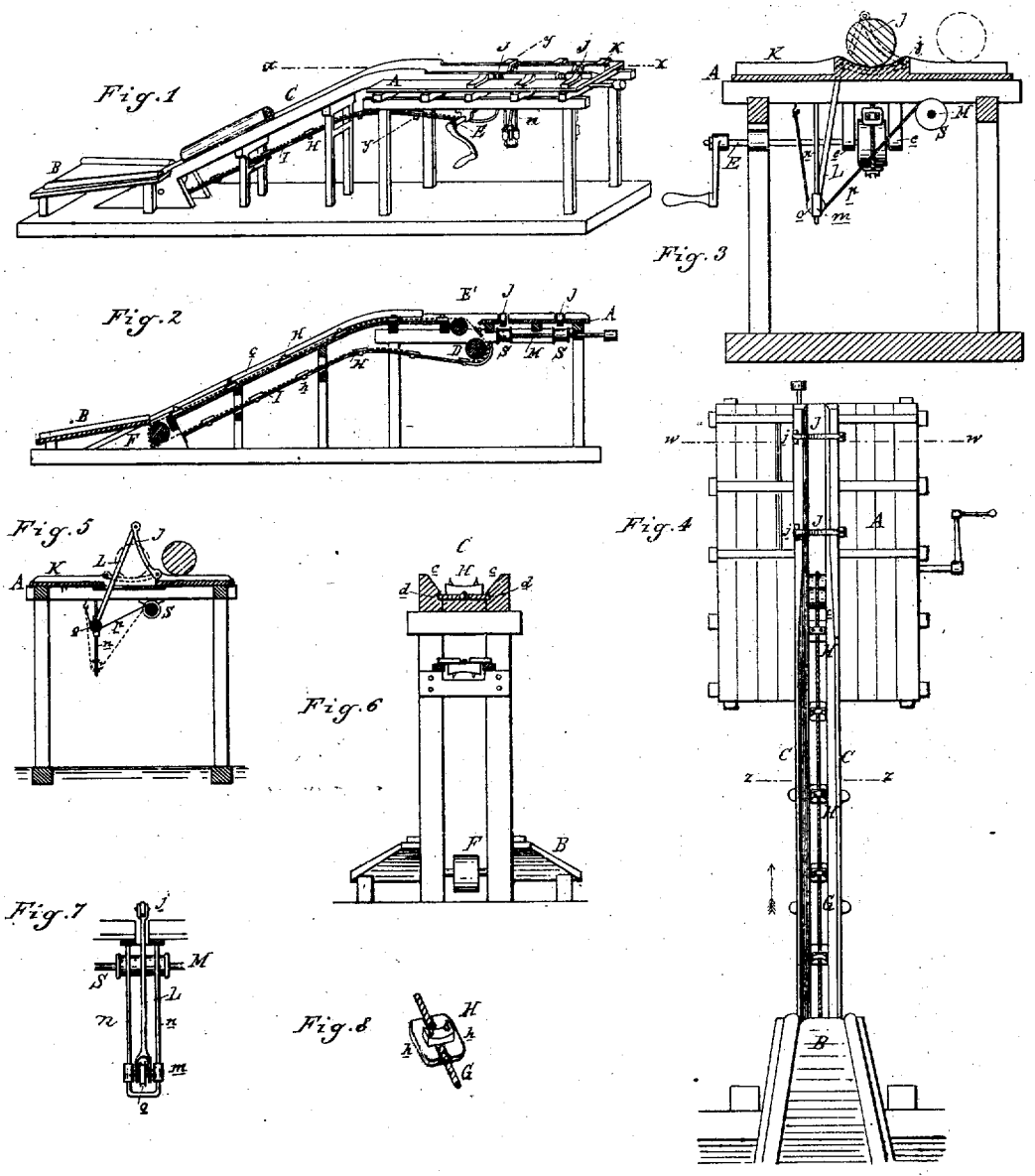
Attest:
A. J. Barthel
Chas. Thurman
Inventor:
R. E. Gleason
By Atty
Thos. S. Sprague
N. PETERS, PHOTO-LITHOGRAPHER, WASHINGTON, D. C.

UNITED STATES PATENT OFFICE.

ROBERT E. GLEASON, OF MUSKEGON, MICHIGAN, ASSIGNOR, BY MESNE ASSIGNMENTS, TO JOHN TORRENT, OF SAME PLACE.

LOG-TURNER.

SPECIFICATION forming part of Reissued Letters Patent No. 9,617, dated March 22, 1881.

Original No. 197,465, dated November 27, 1877. Application for reissue filed June 23, 1879.

*To all whom it may concern:*

Be it known that I, ROBERT E. GLEASON, of the city and county of Muskegon, and State of Michigan, have invented an Attachment to Saw-Mills, of which the following is a specification.

The nature of my invention relates to new and useful improvements in mechanical devices for drawing logs into a saw-mill and removing or turning them off from the devices by which they are drawn in; and the invention consists, primarily, in the combination of spurred saddles of peculiar construction with an endless chain for drawing the logs from the boom or yard to the mill-floor; and, secondly, in the peculiar construction and operation of devices for removing the logs, after they have been drawn up onto the mill-floor, from the saddles to the skids, preparatory to their being rolled onto the saw-carriage of the mill; and, lastly, in the combination of mechanical devices for hauling logs onto the mill-floor and depositing them upon skids by the side of the logway, the whole as more fully hereinafter described.

In the drawings, Figure 1 is a perspective view. Fig. 2 is a vertical longitudinal section at *x x* in Fig. 1. Fig. 3 is a cross-section at *y y* in Fig. 1. Fig. 4 is a top view. Fig. 5 is a vertical section on the line *w w* in Fig. 4. Fig. 6 is a like view on the line *z z* in Fig. 4. Fig. 7 is a plan of one of the devices for rolling the log. Fig. 8 is an elevation of one of the spurred saddles detached.

In the accompanying drawings, which form a part of this specification, B represents the boom or mill-yard, and A the mill-floor, upon which the logs, after being drawn up from the boom or yard, are deposited.

C is a logway or slide extending from the floor of the mill down into the boom, and is provided with beveled sides *c*, to prevent the log from being accidentally thrown off from the saddles, which are secured above and to the endless chain, by means of which the logs are drawn up.

D is a chain-pulley keyed upon the shaft E, and E′ is a guide-pulley, and these pulleys are journaled in hangers *e* secured beneath the floor A of the mill. F is an idler journaled beneath or in the slide or logway at or near its lower end.

The endless chain G passes over the pulleys D and E′ and the idler F, and has secured to it at proper intervals the spurred saddles H, the base-plates *h* of which slide in grooves *d* in the sides of the logway while moving toward the mill; but on the return these base-plates slide upon the guides I arranged beneath the logway.

It will be noticed that these saddles are of peculiar construction, being concave upon their upper faces to conform to the ordinary shape of the logs, and each one is provided on its inner face and near each side with spurs, as shown in Fig. 8. These saddles are provided with base-plates *h*, which project on each side to form flanged slides, to move, as above described, in the grooves *d* and upon the guides I.

J J are levers pivoted at *j*, near the side of the logway next to the skids K. To the other side of these levers are pivoted the rods L, having secured to their lower ends the cross-heads, *m*, which slide in the guides *n* pendent from the floor above. Within the cross-heads are pivoted pulleys *o*, around which pass the cords or chains *p*, one end of each of which is secured to the floor, while the other ends wind upon the drums *s* in the shaft M, which latter is driven, when required, by any convenient means.

In operating this device a log floating in the boom is brought up so that one end will project over the lower end of the logway, where it is seized by the spurred saddles H, and is carried along by them and the endless chain to which they are attached and deposited upon the upper ends of the slides, beyond the point where the chain passes through the floor. A rotary motion is then given to the shaft M, which winds the cords *p* upon their respective drums, causing the rods L to raise and tilt the levers J J, so that the log will roll off upon the skids K. A reverse of this latter-named motion will replace the levers in their original position, ready to receive the log next brought up.

What I claim as my invention, and desire to secure by Letters Patent, is—

1. The spurred saddles H, constructed as described, in combination with and secured to the endless chain G, for elevating logs from a boom or yard to the floor of a mill, substantially as set forth.

2. In a saw-mill, the combination, with the inclined logway C, having beveled sides provided with grooves *d*, of the endless chain G and spurred saddles H, having base plates *h*, adapted to slide in the grooves in the logway, substantially as and for the purposes described.

3. In a saw-mill, the combination of the guides I with the logway C and endless chain G, carrying spurred saddles H, having base-plates *h*, engaging in their forward motion with the grooves *d* in said logway, substantially as and for the purposes described.

4. As an attachment to a saw-mill, a log-elevating device consisting of an inclined logway, C, with beveled inner sides and with grooves *d*, and endless chain carrying spurred saddles with concave faces, and having projecting base-plates *h* engaging with said grooves *d*, and the guides I, constructed and operating substantially as described, and for the purposes specified.

5. In a saw-mill, the combination of the logway C and endless chain G, carrying spurred saddles, for elevating the log from the boom to the floor of the mill, and the pivoted levers J J, for receiving the log from such endless chain and rolling the same upon the skidway, substantially as described and shown.

ROBERT E. GLEASON.

Witnesses:
JAMES SNOW,
ANDREW B. ALLEN.